UNITED STATES PATENT OFFICE.

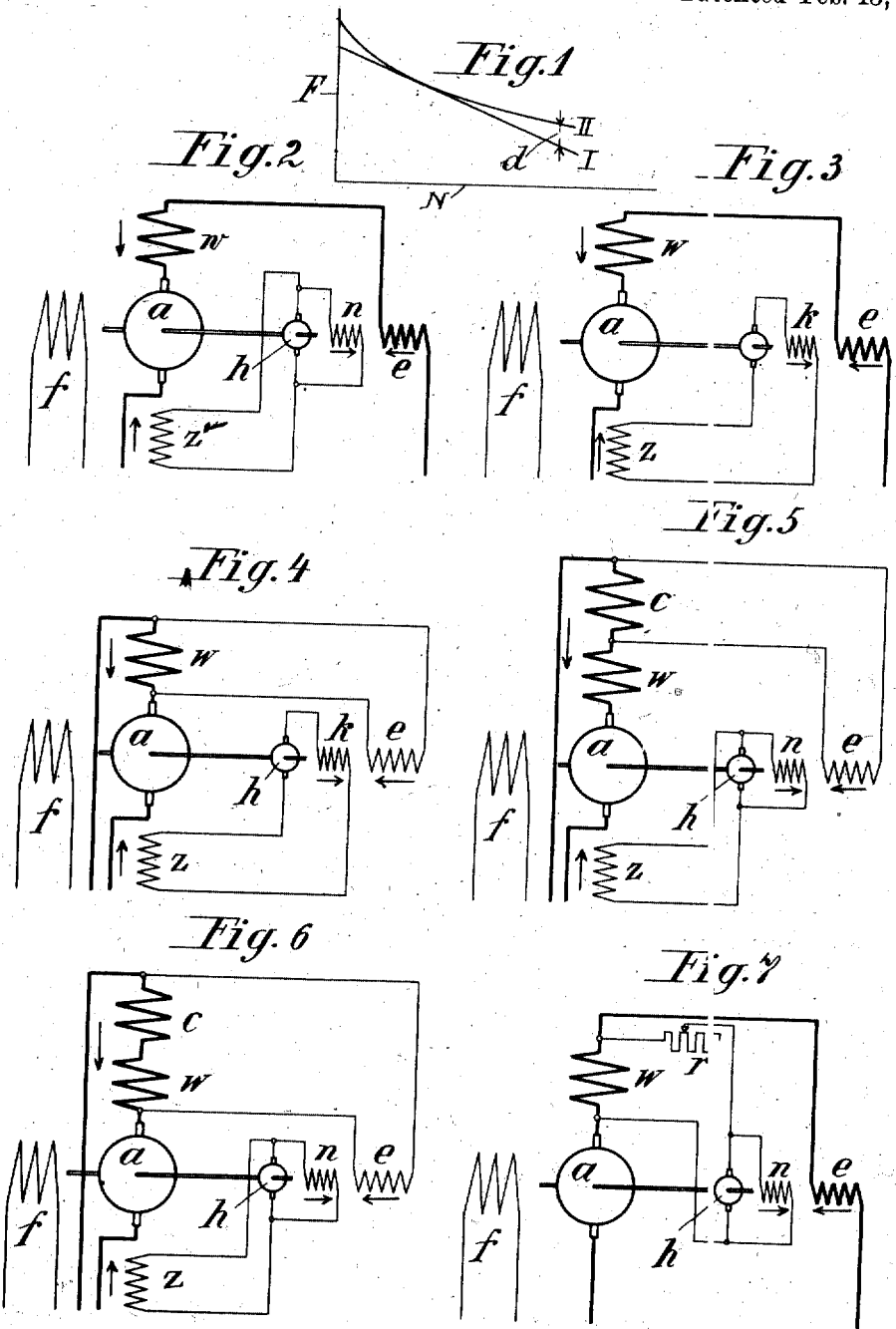

ALOIS FAHRMBACHER, OF CHARLOTTENBURG, GERMANY, ASSIGNOR TO SIEMENS-SCHUCKERT WERKE, G. M. B. H., OF BERLIN, GERMANY, A CORPORATION OF GERMANY.

MEANS FOR PREVENTING SPARKING IN DIRECT-CURRENT MACHINES.

1,215,786.   Specification of Letters Patent.   Patented Feb. 13, 1917.

Application filed October 22, 1912. Serial No. 727,131.

*To all whom it may concern:*

Be it known that I, ALOIS FAHRMBACHER, a citizen of the German Empire, and residing at Charlottenburg, near Berlin, Germany, have invented certain new and useful Improvements in Means for Preventing Sparking in Direct-Current Machines, of which the following is a specification.

My invention relates to improvements in processes and means for preventing sparking in direct-current machines of the type described in the application Serial No. 651,794, filed September 28, 1911, by Ludwig Binder of Berlin, Germany, and a primary object is to obtain a commutating field which is as favorable as possible with a wide range of speed.

To this end, I provide the auxiliary machine with a second field winding which opposes the main field-winding thereof through which flows the main current or a part of the same.

The invention consists in the combination of parts described hereinafter and pointed out in the claims.

The invention is diagrammatically represented in the accompanying drawing, wherein:—

Figure 1 is a diagram showing the variation of commutating fields with the speed;

Fig. 2 shows one form of my invention in which the auxiliary machine has a self-exciting shunt winding which opposes the main field-winding thereof;

Fig. 3 shows another form, in which the auxiliary machine has a counter compounding winding;

Fig. 4 shows a modified form corresponding to that shown in Fig. 3, but in which the main field-winding of the auxiliary machine is connected in parallel with the commutating winding of the main machine;

Fig. 5 shows another modification in which the main field-winding of the auxiliary machine is connected in shunt to the compensation winding of the main machine;

Fig. 6 shows another modification in which the main field-winding of the auxiliary machine is connected in shunt across both the compensation winding and the commutating winding of the main machine, and Fig. 7 shows a simplified form of the invention.

In the above-mentioned application Serial No. 651,794 an arrangement for preventing sparking in direct-current machines is described, in which the commutating field is influenced by an auxiliary machine which runs synchronously with the main machine and works on a second commutating winding connected oppositely to the commutating winding proper. Consequently, when the speed increases the commutating field is weakened. A commutating field is obtained which corresponds fairly exactly to the curve I in Fig. 1 which indicates the dependence of the commutating field F on the number of revolutions N when the strength of current remains constant.

Now it has been found by tests that such a commutating field as indicated by the curve I does not result in the most favorable commutating conditions. On the contrary, a commutating field curve as indicated by the curve II in Fig. 1 would correspond to the most favorable commutation. This curve II at first runs approximately coincident with curve I; at high speeds, however, it runs approximately parallel with the axis of the abicissæ.

Now in order to obtain as favorable a commutating field curve as possible, I provide the auxiliary machine with a second field-winding which opposes the main field-winding through which the main current or a part of the same passes.

Such an arrangement is shown for example in Fig. 2. The main machine is here designated *a*, while *h* denotes the auxiliary machine; *f* is the main field-winding of the main machine and *e* the main field-winding of the auxiliary machine. In this arrangement the auxiliary machine is provided with a self-exciting shunt winding *n* which acts oppositely to the main field winding *e*. Consequently the excitation of the auxiliary machine *h* is at first weakened only little, while when the speed increases it is weakened more. Consequently, in this arrangement the course of the commutating field represented by curve II in Fig. 1 is obtained. The action of the shunt winding corresponds to the difference *d* of the curves I and II which is only small at low speeds, while it is greater at high speeds.

A similar effect is obtained by the arrangement represented in Fig. 3, in which the auxiliary machine *h* is provided with a counter compound winding $k$ which likewise opposes the main field-winding $e$. According to the invention it is thus immaterial whether the second winding $n$ or $k$ of the auxiliary dynamo be fed in series or in shunt by the armature $h$. It is essential, however, that the second field-winding $n$ or $k$ shall oppose the main field-winding $e$. Moreover, the main field-winding $e$ may be fed in series by the main current, as is represented in Figs. 2 and 3.

On the other hand, as shown by way of example in Fig. 4, which otherwise corresponds with the arrangement shown in Fig. 3, the field-winding $e$ may be connected in parallel with the commutating winding $w$ of the main machine; or, as in Fig. 5, be connected in shunt to the compensation winding $c$, or, as in Fig. 6 be connected in shunt across the compensation winding $c$ and the commutating winding $w$ connected in series.

The above-described arrangements can, however, be simplified when the winding $w$ and the additional winding $z$, which is fed by the auxiliary machine $h$ and opposes the winding $w$, are united. This combination is represented by way of example in Fig. 7 for an arrangement corresponding to Fig. 2. The auxiliary machine $h$ is here directly connected to the commutating winding which is now traversed by the difference between the armature current and the auxiliary machine current. When the speed increases the electromotive force of the auxiliary machine increases, the current in the circuit $h$, $w$, $r$ is increased and the current in the commutating winding decreases correspondingly. Too great increase of current can be prevented by means of a resistance $r$ connected in the auxiliary machine circuit, this resistance being variable if desired.

In the present application I have directed the claims to the general arrangement wherein the counter-action exerted upon the commutating winding is obtained by changing the voltage of the auxiliary dynamo in the manner specified, while in a divisional application filed Jan. 21, 1915, Serial No. 3527, I have confined my claims to the specific arrangement of an additional winding $z$ which is supplied by the auxiliary dynamo for counteracting the commutating winding.

I claim:—

1. In a direct current dynamo electric machine of the character described, the combination of a main dynamo having a commutating winding; an auxiliary dynamo whose potential varies proportionately to the speed of the main dynamo for counteracting said commutating winding at increasing speed of said main dynamo; and voltage varying means for more slowly increasing the voltage of said auxiliary dynamo at relatively high speed and more rapidly increasing the same at relatively low speed, both as a predetermined function of the speed of said auxiliary dynamo in general.

2. In a direct current dynamo electric machine of the character described, the combination of a main dynamo having an armature and a commutating winding; an auxiliary dynamo whose potential varies proportionately to the speed of the main dynamo and connected across said commutating winding for counteracting the same; a main field winding on said auxiliary dynamo energized in dependence on the current generated by said armature; and a self-exciting winding on said auxiliary dynamo connected to oppose the action of said main field winding.

3. In a direct current dynamo electric machine of the character described, the combination of a main dynamo having a commutating winding; an auxiliary dynamo geared to said main dynamo; a main field winding on said auxiliary dynamo which is connected to be energized in dependence on the current generated by the armature of said main dynamo; a self-exciting winding on said auxiliary dynamo which is connected to oppose the action of the main field-winding thereof; and connections between said auxiliary and said main dynamo for opposing the action of said commutating winding at increasing speed of said main and auxiliary dynamo.

In testimony whereof, I have signed my name to this specification in the presence of two witnesses.

ALOIS FAHRMBACHER.

Witnesses:
 WOLDEMAR HAUPT,
 HENRY HASPER.